Aug. 27, 1968  J. J. MEZZANO  3,398,703

CONTAINER PALLET AND METHOD OF ATTACHING

Filed Aug. 31, 1967

INVENTOR
JOHN JAMES MEZZANO

BY

Charles P. Bauer.
ATTORNEY

United States Patent Office 3,398,703
Patented Aug. 27, 1968

3,398,703
CONTAINER PALLET AND METHOD OF ATTACHING
John J. Mezzano, Mount Prospect, Ill., assignor to Union Camp Corporation, New York, N.Y., a corporation of Virginia
Filed Aug. 31, 1967, Ser. No. 664,694
4 Claims. (Cl. 108—51)

ABSTRACT OF THE DISCLOSURE

A pallet for supporting a container having opposing closure flaps, the pallet having a base and retaining flaps on opposite sides of the base, the space between the retaining flaps and the base being sufficient to receive the opposing flaps of the container. Supporting members of a height sufficient to receive the forks of a lift truck are secured to the opposite face of the base. A score line intersects the base and the retaining flaps, enabling the entire pallet to be folded to allow the container flaps to be inserted into and removed from between the retaining flaps and the adjacent face of the base. The pallet can be attached to the container without other securing means and locks the flaps of the container in position without other securing means for the flaps.

---

This invention relates to a pallet for a container and more particularly to a pallet and its method of attachment to a container having opposing flaps.

In the transportation of filled containers, it is highly desirable to ship the containers supported upon a pallet having a base suitably elevated above the floor to enable the forks of a lift truck to be received thereunder, in order that the containers may be lifted intact and moved in a single operation without manual effort.

One type of pallet utilized for the transportation of containers is constructed of wood, having an upper and lower deck and a plurality of dividers separating the decks. Because of the construction of the wood pallets, they are usually quite heavy and since they are transported with the containers, the total shipping costs are increased appreciably. Additionally, wooden pallets must be constructed manually by carpenters, therefore their construction cost is quite high.

When existing conventional pallets are utilized, the filled containers to be shipped are stacked upon the pallet and the entire pallet and load of containers is picked up and loaded by a fork lift truck on a means of transportation. They are transported to their destination and then unloaded by a fork lift truck. Quite often during the loading, transportation, and unloading operations, the containers unavoidably fall off the pallet and are consequently damaged.

In order to prevent the containers from falling off the pallet and becoming damaged, many methods have been utilized to secure the containers to the pallet. One method of securing the containers to the pallet is by manually securing a plurality of metal straps about the containers and the pallet. The application of the straps to the composite pallet and container load is a time consuming, expensive operation, and frequently the straps are applied too tightly and damage the containers.

A solution to this problem has been invented by P. Breton, U.S. Patent No. 2,902,199, wherein a cardboard pallet is affixed to the bottom of a cardboard container. Breton provides a pallet having an upper and lower surface, and a plurality of separators therebetween. The upper surface of Breton's pallet has two extensions which are passed through slots in the container and held in interleaved abutment between the subsequently folded bottom flaps. While Breton's pallet was an advance over the prior art, it has some obvious disadvantages. For example, in order to attach Breton's pallet to a container, the container must be empty or the pallet extension will be unable to enter the container. Additionally, the thickness of Breton's pallet extensions must be controlled in order to enable them to be inserted through the container's slots. Further, since the extensions are secured inside the container between the end flaps, the effective space within the container is reduced. When a container is designed to hold a specific amount of material, the space taken up by the pallet extensions may make the container unsuitable for its intended use. Another disadvantage is in the removal of the pallet from the container. The removal can only be accomplished after the container has been emptied. Therefore, after the palletized containers have been shipped to their ultimate destination, they must be stored with the pallet attached until the container is emptied. This obviously wastes a great deal of storage space and prevents the pallet from being used again, until the supported container has been emptied and the pallet can be removed therefrom.

The subject invention eliminates the aforementioned problems by providing an improved, inexpensive, lightweight pallet, that can be attached to a filled container. Additionally, the pallet of the subject invention can be quickly and easily removed from the containers at any time, whether the container is full or empty. The pallet consists of a base, retaining flaps secured to two opposite edges of said base and lying in spaced overlapping relationship to one face of the base. The space between the retaining flaps and the adjacent face of the base is sufficient to receive opposing flaps of a container. Secured to the opposite face of the base is a plurality of supporting members of a height sufficient to accomodate the forks of a lift truck. A score line traverses the base and the retaining flaps in a direction normal to the longitudinal axes of the retaining flaps, allowing the entire pallet to be folded about the score line. The folding of the pallet permits the container flaps to be inserted into and removed from the space between the retaining flaps and the base.

An object of this invention is to provide an improved pallet for a conventional container having opposing closure flaps.

Another object is to provide a pallet that is lightweight and inexpensive to construct.

Another object is to provide an improved pallet that can be quickly and easily attached and detached from a filled or empty container.

Another object is to provide an improved paperboard pallet for a paperboard container.

Another object is to provide an improved pallet that can be folded and transported in a small space.

Another object is to provide an improved pallet which can be attached to opposing flaps of a paperboard container.

Another object is to provide an improved method of attaching a pallet to a container.

Another object is to provide an improved paperboard pallet that can be attached to a container without the utilization of any auxiliary securing means.

Another object is to provide a method of attaching a paperboard pallet to a paperboard container having opposing closure flaps, which pallet serves to lock the flaps in position without other securing means for the flaps.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

For a fuller understanding of the nature and objects of the invention, reference should be had to the following detailed description taken in connection with the accompanying drawing, in which.

Figure 1:
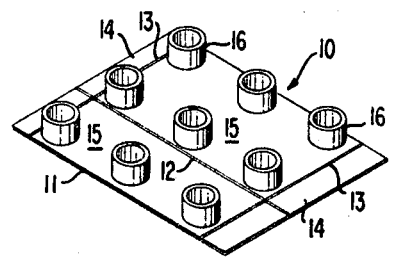
FIGURE 1 is a top perspective view of a pallet in its unfolded condition in accordance with the present invention.

Referring now to the drawings, wherein like or corresponding numbers designate like or corresponding parts throughout the several views, there is shown in FIG. 1 a blank of a pallet 10, preferably but not necessarily, constructed from paperboard. The pallet 10 is illustrated in its fully constructed condition prior to being folded to its operational condition. The pallet 10 comprises a substantially rectangular planar surface 11 preferably constructed from paperboard or other sturdy sheet material. A score line 12 traverses the planar surface 11 at a point intermediate its center and an outer edge. Dispersed adjacent opposite outer edges of the planar surface 11 and traversing the surface at an angle normal to the score line 12 are score lines 13. The score lines 13 divide the planar surface 11 to define a pair of retaining flaps 14 and a base portion 15.

The dimensions of the base portion 15, as defined by the score lines 13 and the opposite outer edges of the planar surface 11, should be substantially the same as the dimensions of the bottom wall of the container to which the pallet 10 will be attached.

A plurality of supporting members 16 are secured to one side of the planar surface 11, within the boundaries of the base portion 15. The members 16 are secured to the planar surface 11 on each side of the score line 12 by gluing or any other manner well known to those skilled in the art. As illustrated in FIG. 1, six of the members 16 are located on one side of the score line 12 and three of the members 16 are located on the opposite side. The distribution and pattern of the members 16 can be varied contingent upon the load to be supported. However, under no conditions should a member 16 be located along the score line 12 or the score lines 13. The members 16 are all the same height, which is sufficient to provide a space, between a supporting surface and the base portion 15 of the pallet 10, capable of receiving the forks of a lift truck. The members 16 may be in the form of wound paper tubes cut to the desired length, or in the alternative, but not shown, can be formed of built up sections of materials, such as corrugated board, other sturdy paper materials, coiled strips of cardboard, or other conventional supports.

FIG. 1 illustrates the members 16 arranged in a pattern, which provides a clear path for entry of the forks of a lift truck from any of the four sides of the pallet. Although nine members 16 disposed in a particular pattern have been illustrated, obviously other patterns and more or less members 16 may be utilized depending upon the load to be supported.

Figure 2:
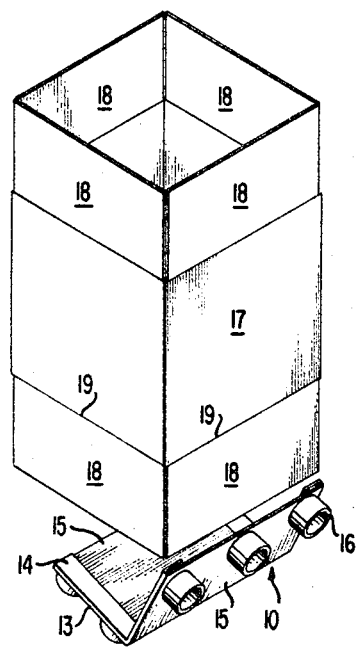
FIGURE 2 is a perspective view of a pallet in its folded condition prior to being attached to opposing flaps of a container.

Referring now to FIG. 2, there is shown a container 17 of a type suitable to be assembled with the supporting pallet 10 in accordance with the present invention. The container 17 is generally parallelepiped in shape and preferably constructed from paperboard. Extending outwardly from each side of the container 17 is a flap 18. The flaps 18 are connected to the sides of the container 17 by score lines 19.

Figure 3:
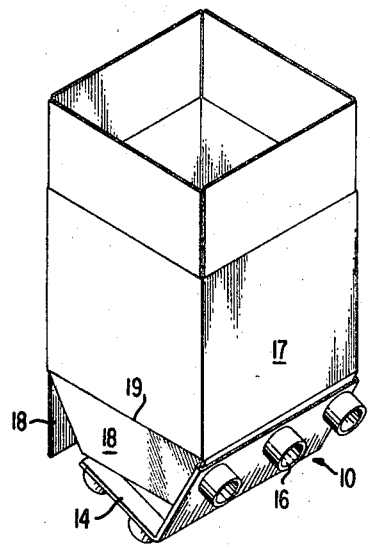
FIGURE 3 is a perspective view of a pallet attached to one of the opposing flaps of a container.
Figure 4:
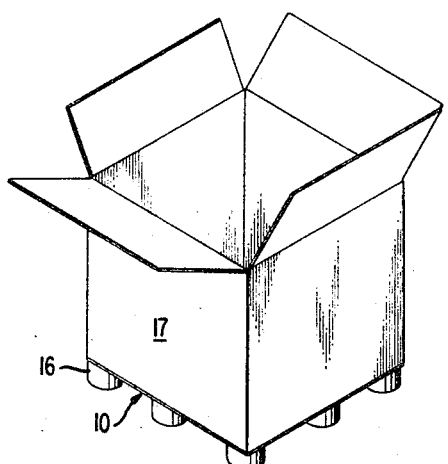
FIGURE 4 is a perspective view of a pallet fully attached to opposite flaps of a container.

When it is desired to secure the pallet 10 to the container 17, as illustrated in FIGS. 2–4, the retaining flaps 14 are folded approximately 180° about the score lines 13, until the retaining flaps 14 overlap an adjacent portion of the base 15 and lie in juxtaposition thereto. A space is provided between the base portion 15 and the juxtaposed retaining flaps 14 sufficient to receive the flaps 18. After the retaining flaps 14 are folded into overlapping juxtaposition to the base portion 15, the base portion 15 and the retaining flaps 14 are folded as a unit to a substantially V-shaped configuration about the score line 12. After a first pair of opposing flaps 18 are folded inwardly, one of the second pair of opposing flaps 18 of the container 17 is now inserted in the space provided between the retaining flap 14 and the base 15, and in this position lies in overlapping engagement to the base portion 15 and adjacent to the internal surface of the score lines 13. The said flap 18 is inserted into the pallet 10 to a point intermediate its connecting score line 19 and its opposite outer free edge.

In the preferred embodiment, in order to ensure the correct positioning and attachment of the pallet 10 to the container 17, the container flaps 18 which are inserted into the pallet 10 should normally be of a length not greater than the distance between the score line 12 and the nearest parallel edge of the base 15. However, in practice, said inserted flaps 18 of any length can be accommodated, providing the length of the bottom wall of the container is not greater than the length of the base portion 15. Because of the ability of the pallet 10 to fold about the score line 12, the opposite flap 18 of the second pair of the container 17 can now be easily inserted between the retaining flaps 14 and the base 15 in the same manner as hereinbefore described with reference to the first inserted flap 18. When both opposing flaps 18 are inserted into the space between the retaining flaps 14 and the base portion 15, and are thereby held in overlapping juxtaposition to the upper surface of the base portion 15, a force is applied to the bottom face of the base 15 about the score line 12. The magnitude and direction of the force applied to the base 15 should be sufficient to cause both portions of the base 15 to assume a common plane substantially parallel to the bottom of the container 17.

Because the pallet 10 is attached to one pair of the flaps 18 of the container 17 and it is not necessary to insert any portion of the pallet 10 into the container, the pallet can be attached to either the top or bottom flaps 18 when the container is full or empty.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A pallet adapted to be secured to opposite bottom flaps of a carton comprising:
   a planar base;
   spaced supports to accommodate forks of a lift fork secured to one face of the base;
   retaining flaps secured along two opposite edges of said base and folded inwardly to overlie the opposite face of said base; and,
   a score line formed in the base and said retaining flaps which is perpendicular to said retaining flaps and located between said supports to permit the folding of said base and retaining flaps into a substantially V-shaped configuration to accommodate the insertion of the opposite bottom flaps between the retaining flaps and the base on each leg of the V.

2. A pallet as claimed in claim 1, wherein the score line is located off-center of the base.

3. A method for securing a pallet to a container having opposing bottom flaps comprising:
  forming a pallet having spaced supports to accommodate the forks of a lift truck on one face of a planar base and having two retaining flaps secured along opposite edges of the base and overlying in spaced relationship the opposite face of the base;
  forming a score line in the base and retaining flaps perpendicular to the retaining flaps and located between the supports;
  folding said base and said retaining flaps towards each other to a substantially V-shaped configuration about the score line;
  inserting one of the container's bottom flaps between the retaining flaps and base on one leg of the V;
  inserting the opposing bottom flap between the retaining flaps and the base on the other leg of the V; and,
  thereafter applying a force to the assembly to restore the base to its planar shape and thereby force the full insertion of the bottom flaps between the retaining flaps and the base.

4. A method as claimed in claim 3, wherein the score line is located off-center of the base.

References Cited

UNITED STATES PATENTS

| | | | |
|---|---|---|---|
| 2,534,011 | 12/1950 | Frye | 108—55 XR |
| 2,673,022 | 3/1954 | Prossen | 108—51 XR |
| 2,762,551 | 9/1956 | Fallert | 108—55 XR |
| 2,902,199 | 9/1959 | Breton | 108—55 XR |
| 3,026,015 | 3/1962 | Severn | 108—55 XR |

FOREIGN PATENTS 926,698  7/1949  Germany.

BOBBY R. GAY, *Primary Examiner.*

G. O. FINCH, *Assistant Examiner.*